Aug. 28, 1934.   A. S. MACKENZIE   1,971,421
COTTON CLEANING AND GINNING APPARATUS
Filed Aug. 6, 1931   2 Sheets-Sheet 1

Inventor
Alexander S. Mackenzie

Attorneys

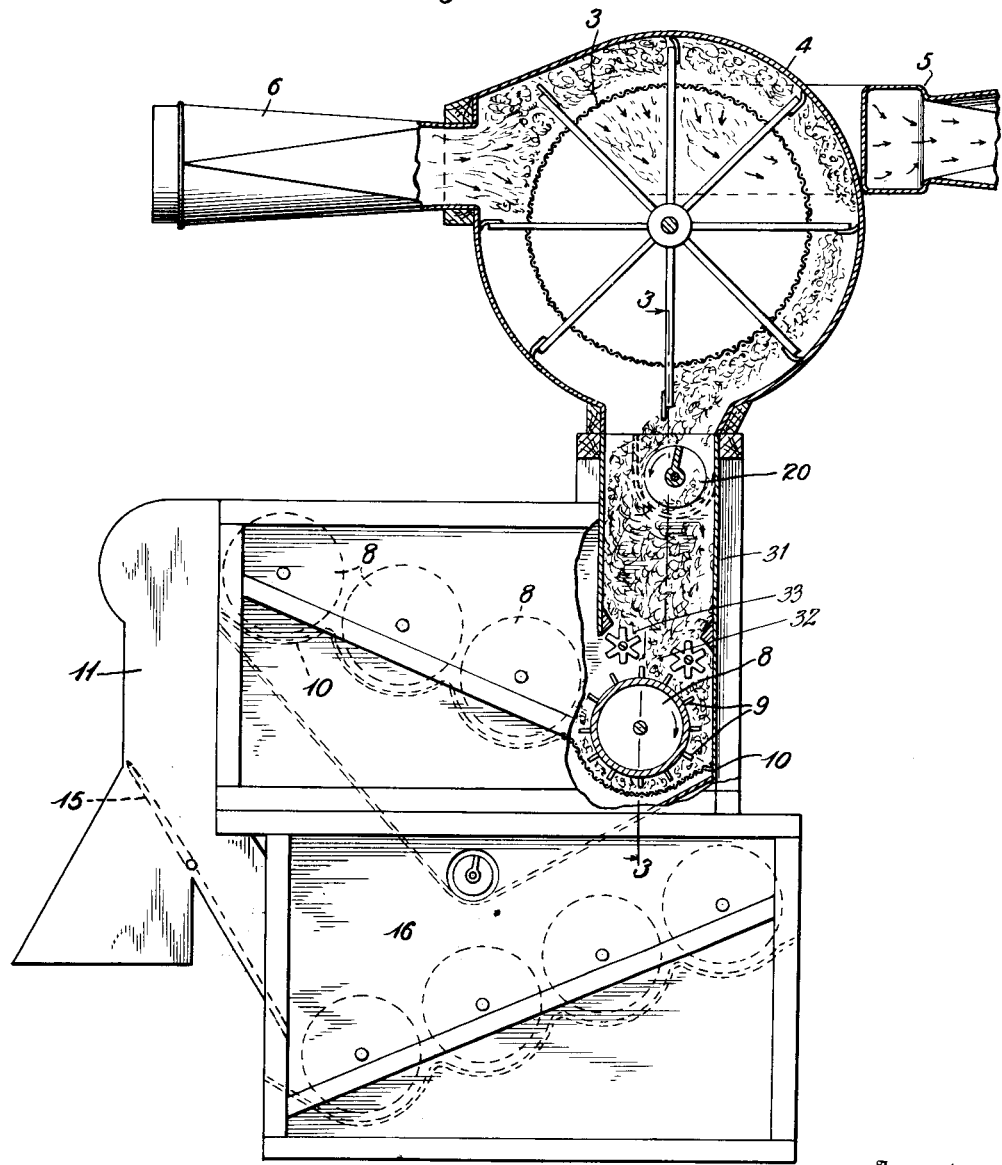

Patented Aug. 28, 1934

1,971,421

UNITED STATES PATENT OFFICE 1,971,421

COTTON CLEANING AND GINNING APPARATUS

Alexander S. Mackenzie, Houston, Tex., assignor, by mesne assignments, to Elk City Cotton Oil Company, a corporation of Oklahoma Application August 6, 1931, Serial No. 555,602

7 Claims. (Cl. 19—74)

The present invention relates to improvements in apparatus for cleaning cotton and feeding the seed cotton to a gin or gins.

In apparatus of the character referred to, it is customary to feed cleaned seed cotton to a plurality of gins in succession any surplus seed cotton being commonly discharged through an overflow outlet and subsequently returned to the gin feeder.

When such arrangement is employed in plants where the seed cotton is subjected to an initial cleaning before entering the feeder mechanism, the practice commonly followed results in a portion at least of the seed cotton being repeatedly subjected to the action of the cleaning mechanism, whereby the product delivered to the gins will not be uniformly cleaned, but portions thereof will be "over-machined."

Another disadvantage of the method heretofore followed is that it does not provide any definite means to control the quantity of cotton subjected to the action of cleaners and causes an irregularity of uniformity in the cleaning system.

Among the objects of the present invention are to overcome the disadvantages of the common practice and insure a constant, steady flow of cotton through the cleaning mechanism, as well as through the gin or gins.

With the foregoing and other objects in view, the invention consists in the construction and arrangement of parts that will be hereinafter more particularly referred to in connection with the accompanying drawings, in which:

Figure 2 is a sectional view, substantially on the line 2—2 of Figure 1, on an enlarged scale, of a portion of the apparatus shown in Figure 1.

Figure 1:
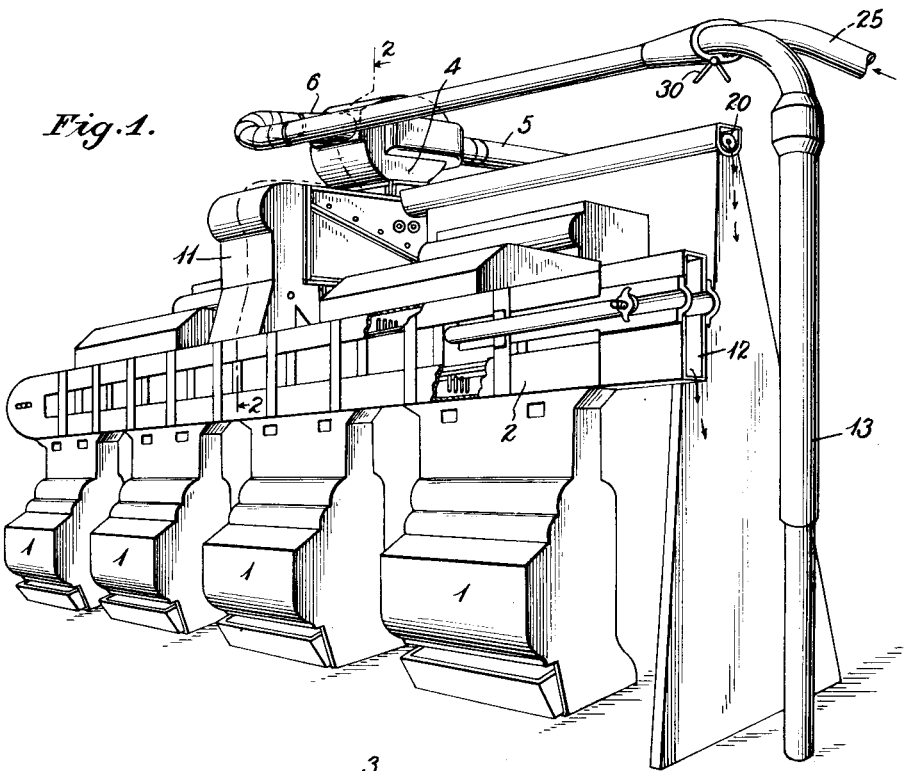
Figure 1 is a perspective view of a cotton cleaning and ginning plant having an embodiment of the invention applied thereto.
Figure 3:
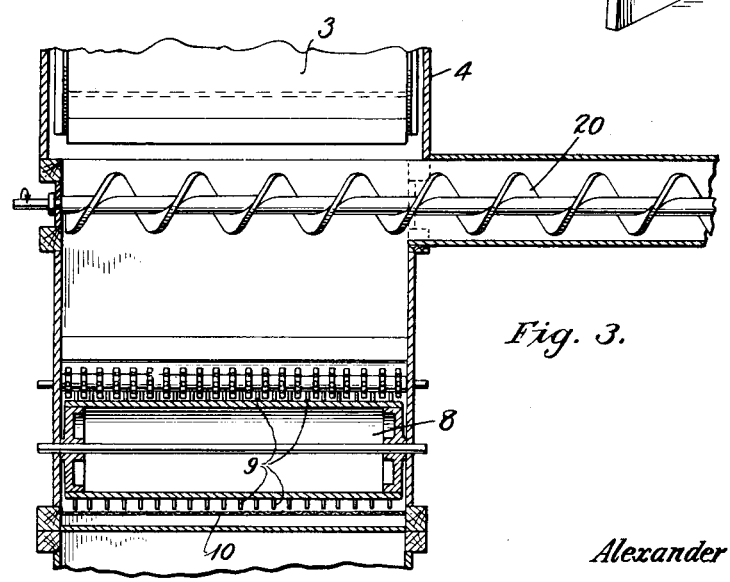
Figure 3 is a vertical section substantially on the line 3—3 of Figure 2.

Referring to the drawings, in the several figures of which corresponding parts are designated by the same reference character and particularly to Figure 1, the cotton treating plant illustrated comprises a battery of four gins 1, the feeder hoppers of all of which are connected by a common distributor housed in a casing 2.

As usual, the apparatus includes a preliminary suction separator comprising a rotary screen cylinder or drum 3 rotatable in a suitable casing 4 and the interior of which screen is connected by a duct 5 with a suitable suction fan not shown.

The seed cotton to be treated is introduced into the casing 4 through a suitable inlet 6 and may, if desired, be preliminarily subjected to the action of a cleaning means comprising ordinarily a screen support and a cylinder or cylinders rotatably mounted above such screen and having radially projecting arms or fingers by which the cotton is advanced over the screens, so that a certain amount of dirt and heavy trash mixed with the seed cotton will be removed before the seed cotton enters the casing 4 of the separator above referred to.

Between the outlet of the separator and the point at which the seed cotton is delivered to the gin feeding means is arranged a suitable cleaner mechanism which, as shown, comprises four cylinders 8, each provided with suitable peripheral teeth 9 and supported to rotate over suitable screens 10.

The seed cotton discharged from beneath the last roll or cleaning cylinder 8 falls into a duct 11, the lower end of which is above and in communication with the casing 2 of the gin distributor.

Such gin distributor commonly consists of an endless belt which is positively driven to travel through the casing 2 and over the inlets to the hoppers of the several gins 1.

As is customary, the distributor casing 2 is provided with an outlet 12 at one end, so that any seed cotton in excess of the capacity of the inlets to the several gins will be discharged onto the floor of the gin house, or other suitable support, and may, as in the ordinary practice, be returned to the separator casing 4 through a suction conduit 13, commonly made in the form of a telescopic tube.

As shown, a valve 15 is located in the outlet 11 of the cleaner described and by adjusting this into the position shown in Figure 2, the seed cotton will not be delivered directly to the casing 2 of the gin distributor but will be discharged into a second cleaning means 16. The outlet from this second cleaning means is commonly connected to a burr extractor and cleaning means, such for example as disclosed in the patent to Lane, 1,724,943, of August 20, 1929.

It will be understood that if the seed cotton to be treated is of such quality of character that it is only necessary to subject it to the action of the cleaner mechanism 8, the valve 15 will be adjusted so that the seed cotton delivered to the chute or conduit 11 will be delivered directly to the casing 2 of the gin distributor.

It will be appreciated that with a construction such as previously described there is no means for controlling definitely the amount of seed cotton passing through the cleaning means and if such amount exceeds the capacity of the several gin hoppers, the surplus or overflow will be discharged through the outlet 12 and by the suction conduit 13 returned to the separator, so that portions thereof will repeatedly be subjected to the action of the cleaning means and thus "over-machined" and, therefore, the material treated by the gins will not be of uniform quality.

To avoid this objection the present invention provides means whereby the quantity of seed cotton delivered from the separator casing 4 to the cleaning mechanism will be regulated and any amount thereof in excess of the capacity of such cleaning means at any time will be withdrawn before being acted upon by the cylinders 8.

As shown the box 31, forming the passage connecting the discharge of suction separator 4 with intake 32 of the first cleaner in the system, is provided with the conventional variable speed feeder rolls 33 at the bottom, and at the top with a screw conveyor 20 extending across the box 31 and in trough to end of gin battery. It will be seen that when box 31 has filled up to conveyor 20 the surplus will be carried by conveyor 20 through the trough and discharged outside of apparatus upon the floor or other suitable support and may, through the suction pipe 13, be again returned to the separator casing 4.

By this means, I insure that practically all of the cotton which is supplied to the gin distributor casing 2 will only be subjected to a single action of the cleaner rolls 8 and, therefore, uniformity of quality of seed cotton supplied to the gins 1 will be insured.

As is customary, the cotton to be treated is supplied to the separator inlet 6 through a pipe 25, the inlet end of which is commonly adapted to be positioned adjacent a wagon loaded with cotton or other source of supply and when the supply has been completely transferred to the separator, a valve 30 is manipulated to cut off the supply pipe 25 and establish communication between the separator inlet 6 and the telescopic conductor 13, so that the overflow from the conveyor 20 and any slight amount that may be discharged through the overflow 12 of the gin distributor casing will be returned to the separator casing 4.

By use of the means hereinbefore described it is possible to so control the feeding of cotton through the several parts of the apparatus, that there is practically no overflow or discharge through the outlet 12 and practically all of the cotton discharged through the conduit 11 will be received in the gin hoppers and as the surplus or overflow cotton is only subjected to a single action of the cleaning devices, the bales produced from the ginned fiber will be of substantially uniform quality throughout.

It is appreciated, of course, that there can be a variation in many of the details described and that the invention is not, except where specifically defined in the appended claims, to be limited to the exact arrangement shown on the drawings.

I claim:

1. In a cotton cleaning and ginning plant, the combination with a separator, a gin, and a cleaning means between the separator and gin, of a conveyor for receiving fiber in excess of a predetermined quantity delivered from the separator and conducting such excess to the exterior of the plant without subjecting it to the action of the cleaning means.

2. The herein described means for cleaning and ginning cotton comprising a suction separator, a cleaning means having its inlet communicating with the fiber outlet of the separator, a gin feeder communicating with the outlet of the cleaning means, and a conveyor adapted to receive fiber in excess of a predetermined quantity discharged through the outlet of the separator.

3. The herein described means for cleaning and ginning cotton comprising a suction separator, a cleaning means having its inlet communicating with the fiber outlet of the separator, a gin feeder communicating with the outlet of the cleaning means, a conveyor for receiving material in excess of a predetermined quantity discharged by the separator prior to its being subjected to the action of the cleaning means, and means whereby such excess may be returned to the separator.

4. The combination in a cotton cleaning mechanism including an inlet for cotton, of a conduit for cotton extending from the inlet, and a conveyor arranged transversely of said conduit and a width less than the width of the conduit to limit the amount of cotton delivered to the cleaning mechanism.

5. The combination in a cotton cleaning mechanism including an inlet for cotton, of a conduit for cotton extending from the inlet, and a screw conveyor arranged transversely of said conduit and of a width less than the width of the conduit to limit the amount of cotton delivered to the cleaning mechanism.

6. The combination in a cotton cleaning mechanism including an inlet for cotton, of a conduit for cotton extending from the inlet and including a vertically arranged portion, and a conveyor arranged transversely of the vertically arranged portion of said conduit and of a width less than the width of the conduit to limit the amount of cotton delivered to the cleaning mechanism.

7. The combination in a cotton cleaning mechanism including an inlet for cotton, of a conduit for cotton extending from the inlet and including a vertically arranged portion, and a screw conveyor arranged transversely of the vertically arranged portion of said conduit and of a width less than the width of the conduit to limit the amount of cotton delivered to the cleaning mechanism.

ALEXANDER S. MACKENZIE.